March 19, 1963 W. R. ARNOLD 3,082,326
NEUTRON GENERATING APPARATUS
Original Filed March 8, 1954 4 Sheets-Sheet 1
FIG. IA
FIG. IB
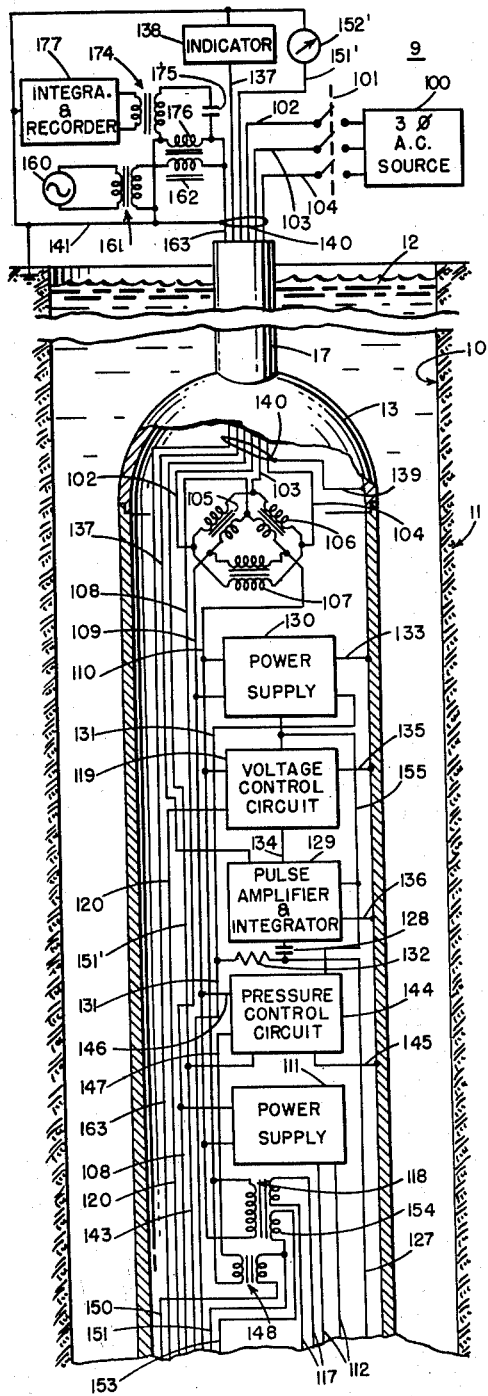
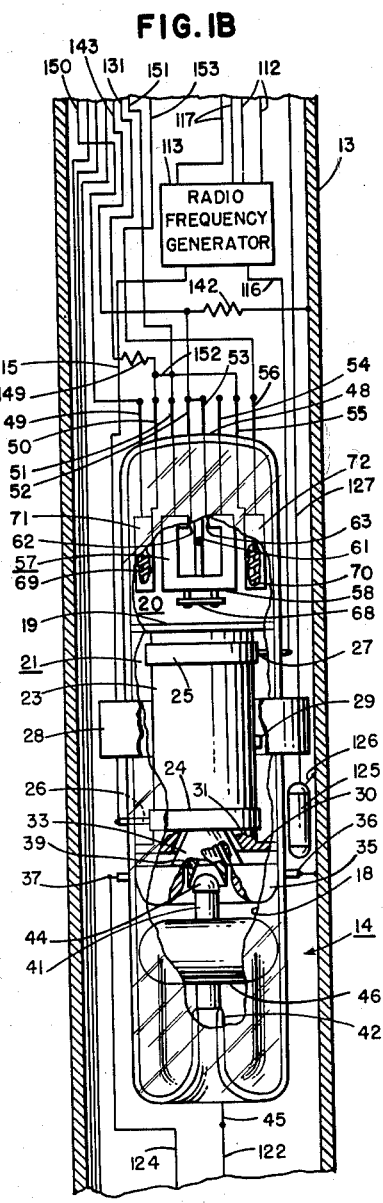
*INVENTOR.*
WAYNE R. ARNOLD
BY Robert Hochfield
HIS ATTORNEY March 19, 1963  W. R. ARNOLD  3,082,326
NEUTRON GENERATING APPARATUS
Original Filed March 8, 1954  4 Sheets-Sheet 2

*INVENTOR.*
WAYNE R. ARNOLD
BY Robert Hockfield
HIS ATTORNEY

March 19, 1963 W. R. ARNOLD 3,082,326
NEUTRON GENERATING APPARATUS
Original Filed March 8, 1954 4 Sheets-Sheet 3

INVENTOR.
WAYNE R. ARNOLD
BY Robert Hockfield
HIS ATTORNEY

March 19, 1963 W. R. ARNOLD 3,082,326
NEUTRON GENERATING APPARATUS
Original Filed March 8, 1954 4 Sheets-Sheet 4

INVENTOR.
WAYNE R. ARNOLD
BY Robert Hockfield
HIS ATTORNEY

United States Patent Office 3,082,326
Patented Mar. 19, 1963

3,082,326
NEUTRON GENERATING APPARATUS
Wayne R. Arnold, Ridgefield, Conn., assignor, by mesne assignments, to Schlumberger Well Surveying Corporation, Houston, Tex., a corporation of Texas
Original application Mar. 8, 1954, Ser. No. 414,761, now Patent No. 2,914,677, dated Nov. 24, 1959. Divided and this application Sept. 8, 1958, Ser. No. 763,154
21 Claims. (Cl. 250—84.5)

This invention relates to methods and apparatus for well logging and, more particularly, pertains to a new and improved neutron generator especially adapted to traverse the narrow confines of a well or bore hole, although useful in a variety of other applications. Since a neutron generator embodying the invention is ideally suited to the needs of well logging service, it will be described in that connection.

This application is a division of co-pending application Serial No. 414,761, filed March 8, 1954, now Patent No. 2,914,677, issued November 24, 1959.

It has been proposed heretofore that a generator of high energy neutrons be employed in neutron-gamma ray or in neutron-neutron logging. As contrasted with a radium-beryllium source conventionally utilized for such logging, a neutron generator may feature a negligible amount of radiation other than the desired neutrons, a higher yield of neutrons, a controlled yield of neutrons, neutrons at higher energies than formerly possible, monoenergetic neutrons and control of the generator so as to permit its deactivation prior to withdrawal from a well. The first five of these attributes are important in obtaining more informative logs, while the last is valuable in minimizing health hazards to operating personnel.

In general, prior neutron generators were only suited for laboratory use and were not designed to meet the severe requirements imposed on well logging equipment. Thus, presently available neutron generators are much too large to be passed through a bore hole. The components are not adaptable to the source-detector spacing requirements of well logging. Moreover, these neutron generators are too critical in their operation and too fragile for logging service.

It is, therefore, a primary object of the present invention to provide an improved neutron generator which meets all requirements of logging service.

A specific object of the present invention is to provide an improved neutron generator which has a small enough diameter to permit its introduction into an inherently cylindrical bore hole.

Another object of the present invention is to provide an improved neutron generator which may be reliably operated during a logging run without requiring critical and continuous operating adjustments.

An additional object of the present invention is to provide an improved neutron generator which may be reliably operated at the high ambient temperatures encountered at depth in logging operations.

Yet another object of the present invention is to provide an improved neutron generator that is rugged enough to operate efficiently and reliably although subjected to the severe physical shocks usually imposed on logging apparatus during transport to and from a well location, as well as during a logging run.

A further object of the present invention is to provide a novel method of well logging in which the improved neutron generator may be employed and featuring more accurate quantitative data regarding the earth formations than heretofore attainable.

These and other objects of the present invention are obtained by providing a neutron generator comprised of an ion source, an ion accelerator and a target which preferably may be an element of the accelerator. The target includes a substance adapted to react with bombarding ions of sufficient velocity to produce neutrons.

More specifically, the generator comprises an envelope containing a gas such as deuterium. A radiofrequency field is employed to excite the gas and cause ionization in the ion source. A probe of the accelerator, which effectively reaches into the region of the ion source, removes positive ions from the source and a suitably high potential difference is impressed between the probe and the target so that these positive ions are accelerated to the required high velocity prior to striking the target. The target includes a material containing tritium, an isotope of hydrogen. From the resulting deuterium-tritium reaction, neutrons are derived.

In order to maintain the neutron flux emanating from the target within prescribed limits, a detector-integrator may be employed to derive a control potential representing a characteristic of the neutron flux, such as the number of neutrons counted per unit time. This potential is employed to adjust the potential applied to the accelerating gap thereby effecting automatic control of the neutron output since the yield is dependent upon the energy of the positive ions incident on the tritium target.

The apparatus may further include a pressure-control system for maintaining the pressure of deuterium gas in the ion source at a preselected value despite the fact that ions of the gas are continuously withdrawn. For this purpose, a pressure transducer is associated with the ion source for deriving a pressure-control potential representing gas pressure. This potential automatically adjusts the amount of gas issuing from a deuterium supply associated with the ion source.

The pressure transducer may, for example, comprise a cathode and an anode exposed to the gas of the ion source. A magnet is employed to provide a magnetic field component for effectively increasing the path for electrons traveling between the cathode and anode. Thus, a continuous ionic discharge occurs. The resulting anode-cathode current is dependent upon the pressure of the gas, and from this current, the aforementioned pressure control potential is derived.

Because the neutron generator is a closed contiguous system, it is necessary to balance two opposing requirements. The gas pressure in the ion source and pressure gauge must be high enough to allow sufficient ionization to be produced in each to give adequate ion currents for their operation. However, the gas pressure must be low enough to avoid appreciable production of ionization in the accelerating gap. A stable balance may be achieved by constructing these three components so that the paths travelled by electrons relative to their mean-free-paths in the ion source and pressure gauge are long, whereas their paths are short relative to the mean-free-path for electrons in the accelerating gap.

As used herein, the term "mean-free-path" denotes the average distance that electrons travel in a particular gas between collisions with atoms or ions of that gas. If a sufficient number of such collisions take place, the ionization produced is cumulative, resulting in a continuous ionic discharge.

The spacing between electrodes of the accelerating gap is made small enough to minimize the path travelled by electrons in this region. In this way, ionization is inhibited despite the extremely high acceleration potential applied to the gap. The spacings between electrodes in the ion source and pressure gauge are made large to maximize the path of travel of electrons and thereby assure the occurrence of strong ionization. In addition, an auxiliary magnetic field may be utilized to cause the electrons to describe non-linear paths, such as spirals, in order to extend effectively the path of travel.

The novel method of well logging in accordance with the present invention makes use of the automatic output control system of the neutron generator. However, the detector-integrator may be arranged to respond either to the emitted fast neutrons or to neutrons which were emitted as fast neutrons but have been slowed to low, or thermal, energies. By controlling the flux of emitted neutrons, in the first of these prescribed methods, indications of other nuclear phenomena, such as capture gamma radiation resulting from the bombardment of the surrounding earth formations by neutrons, provides one type of informative log. On the other hand, by controlling the flux of emitted neutrons in response to neutrons which have been slowed, and recording the resulting gamma radiation, another type of log of the formations may be obtained.

The novel features of the present invention are set forth with particularity in the appended claims. The present invention, both as to its organization and manner of operation, together with further objects and advantages thereof, may best be understood by reference to the following description taken in connection with the accompanying drawings in which:

FIGS. 1A, 1B and 1C illustrate schematically the upper, middle and lower portions, respectively, of neutron well logging apparatus embodying the present invention;

Figure 2:
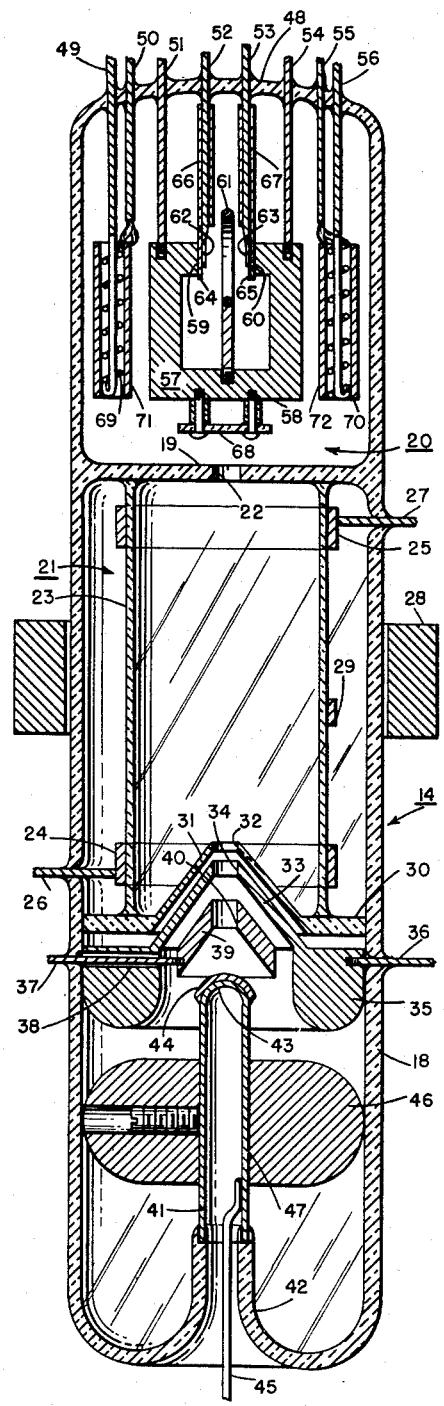
FIG. 2 is an enlarged view in longitudinal section of a portion of FIG. 1B.

In FIG. 1A of the drawings, the neutron well logging apparatus embodying the present invention is shown disposed in a bore hole 10 traversing a plurality of earth formations 11. Bore hole 10 usually contains a hydrogenous drilling liquid 12, such as a water base or oil base mud, and it may be lined with one or more strings of metallic casing (not shown) or it may be uncased as illustrated.

The neutron well logging apparatus may comprise a pressure-resistant housing 13 enclosing a neutron generator 14 (FIG. 1B), a radioactivity responsive device 15 (FIG. 1C) for detecting the phenomena to be observed, and associated electronic equipment required for proper operation of the neutron generator and the detector, as described in greater detail hereinafter.

A shield plate 16, disposed above detector 15, may be employed to shield the detector from radiation emanating from generator 14. If the apparatus is to be used for obtaining neutron-gamma ray logs, the shield may be composed of lead, and if neutron-neutron logs are desired, the shield may be constructed of a boron compound such as boron carbide embedded in paraffin. Of course, a composite shield of lead and boron-loaded paraffin may be utilized if both types of logs are to be made with the equipment, either successively or simultaneously.

Housing 13 is suspended in the bore hole by means of an armored cable 17 which, in connection with a winch (not shown) located at the surface of the earth, is utilized to lower and raise the apparatus in the bore hole in the customary manner. As will be described later in detail, cable 17 comprises a plurality of insulated conductors that electrically connect the apparatus within housing 13 with surface equipment 9.

The neutron generator 14 (FIG. 1B) is suitably supported by a conventional shock mounting (not shown) within housing 13. The generator comprises an evacuated envelope 18, preferably constructed of out-gassed Pyrex glass, and filled with deuterium gas under a selected pressure which may be in the neighborhood of 1 to 10 microns of mercury.

As best seen in FIG. 2, a partition 19 formed by a disc of Pyrex glass effectively divides the upper portion of envelope 18 into a pressure-gauge section 20 (to be described more fully hereinafter) and an ion source section 21. These sections are in communication via a central aperture 22 in partition 19.

A cylindrical support 23, constructed of thin glass, is cemented or otherwise secured at one of its ends to partition 19 and extends into envelope section 21 in essentially coaxial relation therewith. Supported on the outer surface of cylinder 23 are a pair of spaced, annular bands 24, 25 of conductive material. These bands form a discharge gap and each is connected to a respective one of leads 26, 27 which extend through the wall of the envelope 18. These leads are suitably fused to the envelope in a known manner, thereby forming pressure-tight seals.

A cylindrical member 28 of magnetic material, such as an alloy of aluminum, nickel and cobalt, commonly referred to as alnico, receives envelope 18 and is positioned between the transverse planes defined by electrodes 24 and 25. Member 28 is permanently magnetized so that its ends are of opposite magnetic polarity, thereby establishing an axial magnetic field within envelope 18.

The strength of this magnetic field is preselected, in view of the spacing between electrodes 24 and 25 to achieve a path of travel relative to the mean-free-path for electrons, which move spirally due to the field, sufficiently long to promote strong ionization of the gas. For example, a strength of 400 gausses with an electrode spacing of 3 inches has been found suitable.

To initiate ionization of the gas within ion source 21, a pellet 29 of radioactive material, such as radium, is cemented, or otherwise fixed, to the exterior surface of cylinder 23.

Support 23 terminates at, and is cemented to, a glass disc 30 slidably supported at its periphery on the inner surface of envelope 18. Member 30 has a central extension 31 of frustro-conical configuration projecting into the confines of cylinder 23. The tip portion of extension 31 thus contains an opening 32 axially aligned with envelope 18.

A metal probe electrode 33 of frustro-conical form, positioned in interfitting, spaced relation with glass cone 31, is provided with an axially aligned opening 34. The probe has an enlarged metal base portion 35 of generally toroidal form and an electrical connection may be made to the probe by means of a metallic lead 36 that passes through and is fused or sealed to the non-conducting wall of envelope 18.

Another metallic lead 37, also sealed to the envelope 18 passes through a radial opening 38 in base 35 of the probe to provide an electrical connection to a metallic focus electrode 39 of frustro-conical configuration. The focus electrode is positioned in interfitting, spaced relation with probe 33 and it has an axially aligned opening 40.

Neutron generator 14 further comprises a tubular target electrode 41 positioned in axial alignment with respect to envelope 18. This electrode preferably is constructed of a metal having a temperature coefficient of expansion which corresponds to the glass in the envelope. For example, a low-expansion alloy of nickel, cobalt, manganese and iron, commonly referred to as Kovar, may be employed. The lower portion of the envelope is flared inwardly to form a reentrant tubular section 42 in which the lower portion of electrode 41 is embedded and fused.

The target electrode extends to the vicinity of focus electrode 39 where it is closed by an integral, hemispheric cap 43. The spacing between the cap 43 of the target and the probe 33 is arranged to be smaller than the mean-free-path of electrons traversing envelope 18. Thus, ionization of deuterium gas does not occur when these electrodes are suitably energized to operate as an accelerating gap for the deuterium ions.

The cap preferably is plated with a layer 44 of zirconium, or other hydrogen-absorbing metal which is hydrided in a well-known manner with tritium. For example, the zirconium layer may be alternately heated and cooled in an atmosphere of this isotope of hydrogen. Of course, deuterium may be employed for this purpose if a deuterium-deuterium reaction is desired instead of deuterium-tritium reaction.

A lead 45 extends through reentrant envelope section 42 into hollow electrode 41 to which it is soldered or welded in order to provide an electrical connection to the target.

To preclude strong ionization of the gas at the target end of generator 14, an auxiliary member 46 is arranged to prevent the possibility of electrons traversing a gap more than a mean-free-path in length. This member is of generally toroidal form and has an axial opening 47 receiving electrode member 41. It is secured to and electrically connected with the member 41 at a position such that its outer, curved surface is relatively closely spaced with respect to base 35 of the probe. If desired, envelope 18 may be reduced in diameter in an area between members 35 and 46 so as to prevent the existence of a straight path of any consequential longitudinal length along the inner surface of the envelope.

The upper, pressure-gauge section 20 of envelope 18 is provided with a conventional header 48 by means of which a plurality of leads 49–56 are introduced through pressure-tight seals. A horseshoe type magnet 57 of generally rectangular configuration is supported by leads 51 and 54 with its bight end 58 adjacent to partition 19. The magnet has pole faces 59 and 60 facing each other and disposed on opposite sides of the plane of a ring-like electrode 61 that is connected to the inner side of bight 58. The magnet 57 and electrode 61 constitute an anode for the pressure gauge.

The gauge also includes cathode plates 62 and 63 positioned parallel to, but slightly spaced from, individual ones of pole faces 59 and 60 and connected to leads 52 and 53. Layers 64 and 65 of glass insulation are interposed between face 59 and plate 62 and face 60 and plate 63, and these layers are supported by individual glass sleeves 66, 67 which surround and are fixed to the portions of leads 52 and 53 within envelope 18.

A baffle plate 68, constructed of a refractory material of low atomic number, such as quartz or beryllium oxide, is supported on bight portion 58 of magnet 57 in parallel, spaced relation with respect to partition 19. It is arranged to intercept any particles moving through opening 22 in a general direction from ion source 21 towards manget 57.

Also supported within section 20 of envelope 18 by leads 49, 50 and 55, 56 are filaments 69 and 70. Filament 69 is composed of a metallic deuteride, such as zirconium deuteride, arranged so that the pressure of deuterium over its surface increases as the temperature increases. Filament 70, on the other hand, is composed of a getter material, such as zirconium. Thus, at a selected temperature, gases are absorbed by the latter filament. Alternative materials from which filaments 69 and 70 may be constructed are titanium and uranium. To conserves power, individual, tubular heat shields 71, 72 of a reflective material of high melting point, such as tantalum or molybdenum, enclose filaments 69 and 70 and are electrically connected to filament leads 50 and 55.

In constructing generator 14, the usual precautions observed in the fabrication of discharge devices are observed. For example, metal materials for the various electrodes 24, 25, 33, 35, 39, 41, 46, 57, 61, 62 and 63 are selected so that there is relative freedom from gases that may be absorbed prior to or during the fabrication process and which may be later expelled in operation to contaminate the generator. Moreover, with the exception of the electrodes 61, 62 and 63 of pressure gauge 20 which should be constructed of a metal that is a good secondary electron emitter, the electrode metals may be selected on the basis of low secondary-electron-emission characteristics to minimize the possibility of breakdown. Alernatively, a readily outgassed metal may be employed if coated with a thin layer of material of low thermal emissivity. The original outgassing is accomplished via a conventional tube (not shown) which projects externally of header 48. The required amount of deuterium is then introduced through the tube before it is sealed.

Referring now to FIG. 1A, in order to provide power for operating generator 14 and its associated circuitry and yet remain within the voltage and current-carrying capabilities of the conductors in cable 17, power is supplied by a three-phase alternating current source 100 located at the surface of the earth. For example, the source may provide 600 volts at 400 cycles at each of its phases supplied via a three-pole, single-throw switch 101 and cable conductors 102, 103 and 104 to delta-connected step-down transformers 105, 106 and 107 mounted within housing 13. By utilizing transformers having a suitable step-down ratio, there is thus available at conductors 108, 109 and 110 a three-phase supply at 115 volts. It is obvious that by utilizing a voltage on the order of 600 volts, for example, for power transmission in cable 17, at a given power consumption, the power loss due to the resistance of the cable conductors is low, as compared with the loss for transmission at a lower voltage, say 115 volts.

One phase of the supply current is applied over conductors 108, 109 to a conventional power supply 111 adapted to convert the applied alternating voltage to a higher, unidirectional potential. The latter potential is supplied over conductors 112 to the anode circuit (not shown) of a radiofrequency generator 113 (FIG. 1B) operating at a frequency in the range from 10 to 100 megacycles per second. The radiofrequency source, in turn, is connected by conductors 115 and 116 and leads 26 and 27 to electrodes 24 and 25 of ion source 21. Filament power for the radiofrequency generator 113 is supplied over leads 117 by a step-down transformer 118 energized from another phase of the supply current available at conductors 109 and 110.

Figure 1C:
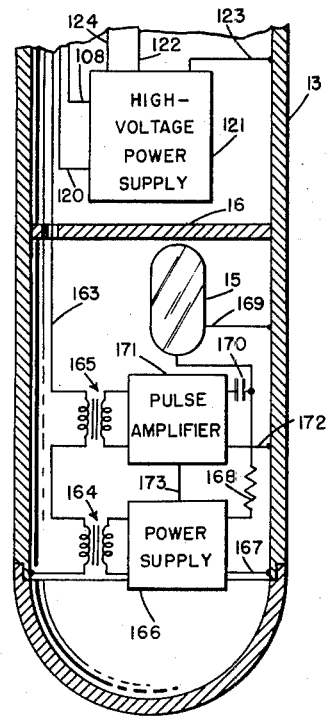

The remaining phase of supply current, available at leads 108 and 110, is fed via a voltage control circuit 119 (to be described more fully hereinafter) and lead 120 to a high voltage power supply 121 (FIG. 1C). The power supply 121 may be of conventional construction, or may be of the type to be later described in connection with FIGS. 5–7. It provides a unidirectional potential between output leads 122 and 123 in the neighborhood of 100 kilovolts. Lead 123 is the positive terminal of the supply and is grounded to housing 13, while lead 122, the negative terminal, is connected to conductor 45 (FIG. 1B) which, as pointed out above, is connected to the target electrode 41. Power supply 121 also supplies a lower voltage of about 1½ kilovolts over leads 124 and 37 to focus electrode 39. The accelerating gap circuit is completed by a connection between lead 36 of probe 33, 35 and housing 13.

In order to control the neutron flux produced by generator 14, a detector (FIG. 1B) in the form of a proportional counter tube 125 is disposed in housing 13 in the general vicinity of the target electrode. The detector is provided with a lining of hydrogenous material (not shown) on the side facing generator 14 and is filled with argon gas. One output lead of tube 125 is grounded to housing 13 by a connection 126 and the remaining output lead is connected by a lead 127 to a coupling condenser 128 (FIG. 1A), in turn, connected to a conventional pulse amplifier and integrator unit 129. The necessary voltage for counter tube 125 is supplied by a conventional power supply 130, energized from power leads 109 and 110, over a lead 131 and a decoupling resistor 132. The power supply circuit is completed by a connection 133 to housing 13.

The output of unit 129, which is representative of a characteristic of the generated neutron flux, such as counts per unit time, is applied to the input circuit of voltage control circuit 119 over a lead 134 and connections 135 and 136 to housing 13. Circuit 119 may be of conventional construction; for instance, it may include a magnetic amplifier connected in a servo circuit which compares the potential from amplifier-integrator 129 with a reference potential to derive a control effect. This control effect may be the adjustment of the value of an impedance effectively connected between leads 110 and 120. Accordingly, the potential which energizes high-voltage power supply 121 is dependent upon the generated neutron flux so that this flux is automatically maintained at a substantially constant value.

Amplified pulses from unit 129 are supplied via a conductor 137 which extends through cable 17 to an indicator 138, such as an integrator-voltmeter, of surface equipment 9. The indicator circuit is completed by a connection 139 between housing 13 and shield 140 of the cable and a ground connection 141 at the earth's surface between the shield and the indicator 138.

In order to energize the pressure-measuring device in envelope section 20 (FIG. 1B), anode lead 51 (or 54) is connected to power supply 130 by an extension of lead 131 through resistor 149 and jumper lead 152. Cathode leads 52 and 53 are tied together and are connected by a resistor 142 to housing 13. The resistance value of resistor 142 is selected, in a known manner, to counteract the negative resistance characteristics of the glow discharge between anode 57, 61 and cathodes 62, 63 of the pressure gauge as well as to derive a voltage representing anode-cathode current. Resistor 149 interposed in lead 131 is similarly employed to counteract the effect of the negative resistance of the ionic discharge in ion source 21.

The junction of resistor 142 with the cathode leads is connected by a lead 143 to one input terminal of a pressure control circuit 144, having its other input terminal connected by a lead 145 to housing 13. Circuit 144 may be of conventional construction comprising, for example, a magnetic servo amplifier for comparing the potential developed across the resistor 142 with a reference potential to present an impedance between output circuit leads 146 and 147 that is automatically controlled by the difference between the developed and reference potentials.

Lead 146 is connected to supply lead 109 and lead 147 is connected to one terminal of the primary winding of a step-down transformer 148. The remaining primary terminal is connected to supply lead 110. The secondary winding of transformer 148 is connected by leads 150 and 151 to leads 49 and 50 of deuterium-emitting filament 69, thereby completing the automatic pressure control system. A connection 152 between anode 57 of the pressure gauge and filament 69 is employed to maintain these elements at the same potential in order to preclude the possibility of an ionic discharge therebetween.

Since the potential developed at resistor 142 is a measure of the pressure in envelope 18, this potential is also supplied by a cable conductor 151' to an indicator 152', such as a voltmeter, of surface equipment 9. If desired, a pressure-representing-potential derived in control circuit 144 may be utilized to actuate indicator 152'.

Lead 55 of getter filament 70 is connected to conductor 151 and its other lead 56 is connected by a conductor 153 to another secondary winding 154 of step-down transformer 118. A connection from the secondary winding 154 to lead 151 completes the circuit. Thus, filament 70 may be energized continuously during operation of the neutron generator.

A similar form of gas-pressure control system is disclosed in the copending application of Sidney Soloway, filed December 21, 1953, bearing the Serial Number 399,505 and issued March 31, 1959 as Patent No. 2,880,373.

Power supply 130 also provides a voltage for energizing units 119, 129 and 144. This voltage is supplied via a lead 155 and various extensions thereof.

The portion of the well logging apparatus thus far described relates to the generation of neutrons for irradiating formations 11. In order to obtain a log, for example of the resulting gamma radiation, means are provided for energizing detector 15, which may be a Geiger-Mueller tube (FIG. 1C), and for recording a characteristic of its output. To this end, a source of alternating current 160 in surface equipment 9 is coupled to a transformer 161 having one terminal of its secondary winding connected to the grounded shield 140 and the other terminal connected via an isolating choke 162 to a conductor 163 of cable 17. Conductor 163 traverses housing 13 and is connected to the housing via the series-connected primary windings of transformers 164 and 165. Transformer 164 is a power transformer for a conventional power supply 166 having a connection 167 to housing 13.

Power supply 166 develops the high voltage for operating tube 15 which is applied thereto via an isolating resistor 168. The remaining terminal of tube 15 is connected by a lead 169 to housing 13. The junction of resistor 168 with the lead to tube 15 is connected by a coupling condenser 170 to the input circuit of a conventional pulse amplifier 171. The input circuit is completed by a connection 172 to the housing and a voltage of suitable magnitude for operating the amplifier is derived from power supply 166 over a lead 173. Transformer 165 is a pulse transformer to which the output signal of amplifier 171 is applied.

This output signal is derived at the surface equipment 9 by a pulse transformer 174. The primary winding of the transformer is connected to a filter including a series condenser 175 and shunt choke 176 for attenuating voltages at the frequency of source 160. The transfomrer's secondary winding is connected to a conventional integrator and recording unit 177. Unit 177, for example, may comprise a capacitor for deriving a potential representing the number of pulses applied per unit time and a recording voltmeter to which this potential is applied. The recording medium of the voltmeter is displaced in a customary manner in synchronism with movement of housing 13 through bore hole 10 so that a continuous log may be obtained.

In operation, housing 13 is lowered into bore hole 10 prior to the closing of switch 101. Thus, operating personnel are shielded from any dangerous radiation emanating from neutron generator 14 by the earth formations 11 and drilling fluid 12.

With switch 101 closed, radio frequency generator 113 is energized and its output is supplied to electrodes 24 and 25 of ion source 21. In addition, high voltage power supply 121 delivers its output voltage to the accelerating gap defined by the periphery of aperture 34 in electrode 33 and layer 44 of target 41, as well as an intermediate or lower potential to focus electrode 39. Moreover, a positive potential is supplied by source 130 to anode 57, 61 relative to the cathodes 62, 63 of the presusre gauge 20.

Although the potential between the electrodes of ion source 21 in association with the axial magnetic field created by magnet 28 are conducive to strong ionization of deuterium gas, this phenomenon is a cumulative process which must be initiated from an external source. Normally, in equipment operated at the surface of the earth, the usual cosmic radiation present is sufficient to initiate a discharge. However, the generator 14 is shielded when in the bore hole; thus, radioactive material 29 is provided for this purpose.

Accordingly, initial ionization of the gas is followed by a continuous ionic discharge in the radiofrequency field coupled to the gas via electrodes 24 and 25. Glass partition 19 serves to prevent the recombination of ions at the surface of magnet 57, glass cylinder 23 prevents recombination at electrodes 24 and 25, while conical glass member 31 prevents such recombination at the surface of probe 33. Therefore, ion source 21 operates more efficiently in producing ions from the gas present in envelope 18 than might otherwise be possible.

Cylinder 33 is constructed of glass thin enough so that the radiofrequency voltage drop across it, due to its high dielectric constant, is low. This results in a higher radiofrequency voltage across the gas in the ion source 21 and a more efficient coupling, between oscillator 113 and the gas, than is otherwise possible.

Since probe electrode 33, 35 is at the potential of housing 13, while magnet 57 is at a positive potential relative thereto, ions in source 21 tend to drift in a direction from the magnet toward the probe. Some of these ions pass through opening 32 in glass member 31 and opening 34 of probe 33 and are thus introduced into the accelerating gap defined by the probe and the target 41, 43. Because of the high potential impressed between the probe and the target, positive ions are accelerated to high velocities prior to striking target material 44. The highly accelerated positive deuterium ions thus react with the tritium in target material 44 and neutrons of energies at a level of 14 million electron volts are generated.

Inasmuch as the accelerated ions must pass through opening 40 in the focus electrode 39, which is maintained at a negative potential relative to probe 33, defocusing of the ion beam may be effected prior to its impingement at target material 44. Accordingly, instead of a highly localized point of impingement, as might otherwise result, the ion beam is distributed over a larger area of the target, thereby preventing localized heating and burn-out of the target material.

Positive ions upon striking target material 44 produce secondary electrons which are accelerated across gap 44–33 in the direction opposite to positive ion travel. Most of these electrons pass through openings 34 and 32, traverse source 21 without collision and eventually pass through opening 22 and partition 19. Such accelerated electrons impinge upon baffle plate 68 which absorbs their energies by conversion to heat which is dissipated. Consequently, these electrons are prevented from striking magnet 57 where they might undesirably cause localized heating and the occlusion of absorbed gases. In addition, plate 68 serves to minimize recombinations of electrons and ions at the surface of magnet 57. Furthermore, since baffle plate 68 is made of low atomic weight materials, only soft X-rays are produced by electron bombardment.

Filament 70 is heated by the curent flowing through it to a temperature in the neighborhood of 1200° C. At this temperature, the filament reacts chemically with such gases as oxygen and nitrogen which may be present as impurities in the tube, and absorbs them; but it does not absorb deuterium.

High energy neutrons emanating from target material 44 irradiate formations 11 as well as detector 125. A small fraction of the fast neutrons incident on the detector produce recoil protons in the hydrogenous lining. Some of these protons cause ionization in the argon and the resulting pulses are amplified and integrated in stage 129 to develop a control potential supplied to voltage control circuit 119. If the neutron flux increases, the number of counts per second increases and the voltage control circuit reduces the voltage supplied to high voltage power supply 121. Accordingly, a lower voltage is applied to the accelerating gap, thereby decreasing the neutron flux. Conversely, a decrease in the neutron flux causes an increase in the high voltage supplied to the accelerating gap. In this way, the neutron yield remains substantially constant over a wide variety of operating conditions. Since only a small fraction of the neutrons are intercepted by the detector, it is not overloaded even though it is relatively close to the intense source. Moreover, because of the small attenuation in the detector, the symmetry of the flux of fast neutrons incident on the surrounding formations is not adversely affected.

In the pressure control system, positive ions are created in the pole gap of magnet 57 by spiralling electrons which are emitted from cathodes 62, 63 when positive ions strike these cathodes. Further electrons are emitted which, in turn, produce further positive ions and a continuous discharge occurs. The resulting current is a function of the gas pressure, since that pressure determines the number of positive ions which can be produced. The potential developed across resistor 142 controls pressure control circuit 144 which, in turn, adjusts the power that is supplied to deuterium-emitting filament 69. This filament operates in the temperature range of approximately 300° to 600° C. and the control circuit is arranged so that the filament temperature is increased when a decreased voltage at resistor 142 indicates a decrease in pressure within envelope 18. Conversely, the filament temperature decreases when the pressure in the envelope increases and pressure may thus be maintained constant at a desired value.

Of course, the circuit may be suitably arranged so that the temperature of filament 69 may be reduced automatically to a temperature at which it absorbs deuterium to compensate for an increase in pressure and, upon a reduction in pressure, is returned to an emitting temperature.

Irradiation of the formations 11 by the high energy neutrons produced in generator 14, results in nuclear radiation that is incident on Geiger-Mueller tube 15. This occurs in a process wherein the neutrons are slowed to energy levels low enough to permit reactions producing capture gamma rays. The detector responds to gamma rays and its output is in the form of pulses which are amplified in stage 171 before being fed to the integrator and recording unit 177 of surface equipment 9. It is therefore apparent that a neutron-gamma ray log is obtained. This log features information regarding the earth formations traversed by the bore hole, such as enumerated in detail in the copending application of Clark Goodman, filed March 11, 1952, bearing the Serial Number 275,932, and assigned to the same assignee as the present application.

Since automatic controls are provided for pressure and neutron flux, the neutron generator embodying the present invention may be reliably operated during an entire logging run. The operator need not be concerned with any critical and continuous adjustments to the equipment.

In well logging the variation in gamma radiation incident on detector 15 should be indicative of changes in the surrounding formations 11 only. Variations in the neutron yield will, of course, produce changes in the gamma radiation received by 15. Hence, maintenance of a constant neutron yield is an essential feature of this aspect of the present invention.

In general, by reason of the construction of generator 14, as evident in FIGS. 1B and 2, a relatively rugged device is possible. Moreover, generator 14 has a configuration and is small enough so that it is adapted to the elongated, small-diameter, cylindrical housings suitable to be passed through conventional oil field bore holes. The remainder of the bore hole apparatus may be readily accommodated to the size and ruggedness specifications of bore hole apparatus.

Therefore, the well logging apparatus embodying the present invention meets all requirements of logging service.

As an alternative to the control of neutron flux by adjusting the voltage applied to the accelerating gap, target layer 44 may be loaded with tritium so that the content of this gas in the target increases in a radial direction and a voltage control circuit, similar to unit 119, is provided to control the voltage applied to focus electrode 39. The system is arranged so that as the neutron flux decreases, the diameter of the ion beam incident on target layer 44 increases and vice versa. Thus, the neutron flux may be maintained at a selected, constant value. In actual operation, a uniform target attains the desired tritium distribution in a short time.

Of course, if desired, the tritium content in layer 44 of the target may be arranged so that it increase along a given path. In this case, a pair of deflection elements, such as electrostatic plates, may be employed in place of focus electrode 39. Thus, by adjusting another dimensional characteristic of the beam of ions incident on the target layer, namely, its deflected position along the aforesaid given path, rather than its cross sectional area, the neutron flux output of generator 14 may be controlled in a desired manner.

Instead of a filling gas of deuterium, a mixture of tritium and deuterium may be employed in suitable proportions so as to provide the means for constantly refilling target layer 44 with an equilibrium concentration of each of these gases. For example, a mixture of 50% tritium and 50% deuterium has been determined as suitable, and this mixture may be used for hydriding gas-emitting filament 69.

In operation, the tritium and deuterium gases are ionized in source 21 and ions of both are accelerated and impinge upon target layer 44. The deuterium ions are involved in the deuterium-tritium reaction for neutron generation, as described hereinbefore, while some of the accelerated tritium ions are absorbed by the layer.

By thus continuously replacing tritium in the target layer 44, frequent replacement of the target is avoided. Moreover, the expensive gas tritium is conserved, as is evident from the following discussion.

In the usual fabrication process for zirconium target layer 44, the layer is much thicker than the depth of penetration of bombarding ions; however, the entire layer absorbs tritium during the hydriding process. Consequently, only a fraction of the tritium enters into the neutron-producing reaction.

If a deuterium-tritium mixture is employed, the target layer may be hydrided merely by operating the generator. Only a shallow surface portion of the layer 44, within range of bombarding ions, is thus filled with tritium and essentially none is unused when the generator is employed to derive neutrons.

Of course, other types of logs may be derived. For example, detector tube 15 may be a proportional counter lined with hydrogenous material or a boron compound. In that way, a neutron-neutron log may be obtained. Moreover, by providing suitable detectors, both a neutron-gamma ray and a neutron-neutron log may be obtained simultaneously.

If desired, generator 14 may be pulsed and the detection system associated with tube 15 gated to achieve an activation log. For example, the power supply that provides the accelerating potential for generator 14 may be arranged to deliver the high voltage in pulses, rather than at a constant value. Alternatively, a steady voltage may be applied to the accelerating gap and pulses, of positive polarity relative to probe 33, 35, may be applied to focus electrode 39. In either case in which the neutron generator is pulsed, higher peak voltages may be employed without breakdown in the accelerating gap, as contrasted with a non-pulsed generator.

Pulsing may be accomplished by selectively energizing ion source 20. To this end, a conventional pulsing circuit may be associated with radiofrequency generator 113 so that the generator delivers radiofrequency energy to the ion source during operating intervals of selected duration. Accordingly, neutrons are generated only during such intervals.

Another type of log which may be obtained with the system shown in FIGS. 1A–C, requires that monitor 125 be responsive to neutrons slowed by the formations to thermal energy levels. Preferably, the monitor is positioned in the vicinity of detector 15 and may comprise a counter tube lined with boron and filled with argon gas, or it may be unlined and filled with boron trifluoride gas.

In operation, the high energy neutrons from generator 14 are slowed by the earth formations and the bore hole fluid to thermal levels and some are returned to detector 125. Inasmuch as the output of detector 125 is employed in stage 129 to derive a control potential for operating the control circuit 119, the high-energy neutron flux output of generator 14 is adjusted in a manner maintaining the flux of returning thermal neutrons constant. Accordingly, the log of capture gamma rays detected by counter 15 is representative of a condition of constant thermal neutron flux. This log provides information regarding the neutron-capturing and gamma-ray production qualities of the zones under investigation and is relatively independent of formation porosity. Such a log may be useful, for example, in correcting for the chlorine content of formations of similar porosity.

This type of control of the generated neutron flux in response to returning slow neutrons may also be employed in gamma-ray spectral analysis. For such an application, a conventional gamma-ray spectrum analyzer may be substituted for detector 15 and its associated circuits.

If a simultaneous thermal neutrol log is desired, a fast neutron counter like the one designated 125 in FIG. 1B may be connected to indicator 138.

Of course, the monitor may be made responsive to epithermal neutrons. This may be accomplished by using a counter tube for thermal neutrons, as described above, enclosed in a cadmium shield.

Figure 3:
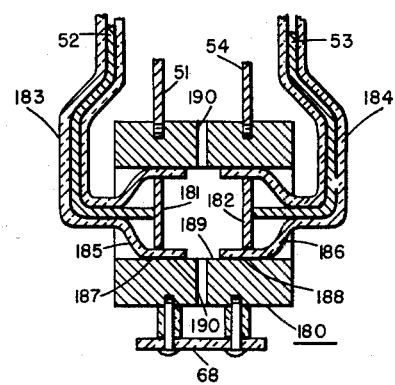
FIGS. 3 and 4 are views in longitudinal section of modifications which may be made to respective portions of the structure of FIG. 2.

In FIG. 3, there is illustrated in longitudinal cross section a modified form of ionization gauge which may be employed in section 20 of generator 14. It comprises a cylindrical magnet 180 supported by leads 51 and 54 within, and in transverse relation to, envelope 18. Disc-like cathode plates 181 and 182 are arranged in parallel, spaced relation within the cylindrical magnet and are connected to leads 52 and 53, respectively, which pass through header 48 of envelope 18. The portions of leads 52 and 53 within the envelope are coated with respective sleeve-like layers 183 and 184 of glass insulation which flare outwardly to form funnel-like transition sections 185 and 186 connected to cylindrical sections 187 and 188. The latter sections, 187 and 188 isolate or shield the plates 181 and 182 from the inner wall surface of magnet 180, but are spaced from one another to define an exposed annular surface portion 189. To communicate the space between cathodes 181 and 182 with the gas in envelope 18, cylinder 180 is provided with a plurality of radially-extending openings 190. Alternatively, the plates 181, 182 and glass sections 187, 188 may be reduced in diameter for this purpose.

In operation, the magnet 180 produces a magnetic field component directed transversely with respect to cathode plates 181 and 182. Annular portion 189 of the magnet functions as an anode. Thus, the gauge performs in essentially the same manner as does the one illustrated in FIG. 2.

The neutron generator of FIG. 2 may be modified in the manner shown in FIG. 4 wherein the portion of the generator below partition 19 is represented in longitudinal cross section.

The modified neutron generator includes an ion source section 191 comprised of a cylindrical, wire helix or anode 191a connected to and supported by a plurality of support rods 191b. A cathode plate 191c is supported at the upper end of helix 191a in coaxial alignment therewith by an L-shaped rod 191d which is secured to one of a plurality of support rods 191e. Supports 191b and 191e extend longitudinally through envelope 18' and are suitably arranged to pass through partition 19 (FIG. 1), to one side of the elements within envelope section 20, and through header 48.

The lower extremities of support rods 191e are connected to a flat, disc-shaped metallic electrode 191f which is spaced from the lower extremity of helix 191a. Electrode 191f has its peripheral edge 191g flared upwardly and is provided with a central opening 191h, also having an upwardly flared edge. A second cathode 191i having a central opening 191j is supported in the vicinity of the plane of the lower end of helix 191a by a wire helix 191k which extends upwardly from disc 191f. Electrodes 191f, 191i and 191k may be termed a probe assembly by means of which ions are extracted from source 191.

A cylindrical magnet assembly 192 receives the portion of envelope 18' within which ion source 191 is enclosed. The magnet assembly comprises a principal section 192a of rectangular cross section and upper and lower auxiliary sections 192b and 192c of triangular cross section. The auxiliary section 192b and 192c are designed to minimize fringing effects, thereby to provide, in connection with principal magnet section 192a, a more uniform axial magnetic field for ion source 191 than otherwise possible.

If desired, additional elements (not shown) of magnetic material may be disposed within envelope 18' so as to shape or control the magnetic field and provide a required uniformity in the field between cathodes 191c and 191i.

The lower portion of envelope 18' is flared inwardly to form a reentrant, coaxial tube 193 which is fused to a cylindrical, metal connector 194 on which a coaxial target assembly 195 is supported. This assembly comprises a cylindrical glass insulator 195a having its lower end fused to the upper end of cylinder 194 and its upper end fused to the lower end of a metal tube 195b. Metal tube 195b extends upwardly and is terminated by a flat target member 195c constructed of zirconium, for example, which is hydrided with the isotope tritium. A metal connector 195d is welded within tube 195b at the upper extremity thereof, and is provided with a threaded opening 195e.

Figure 4:
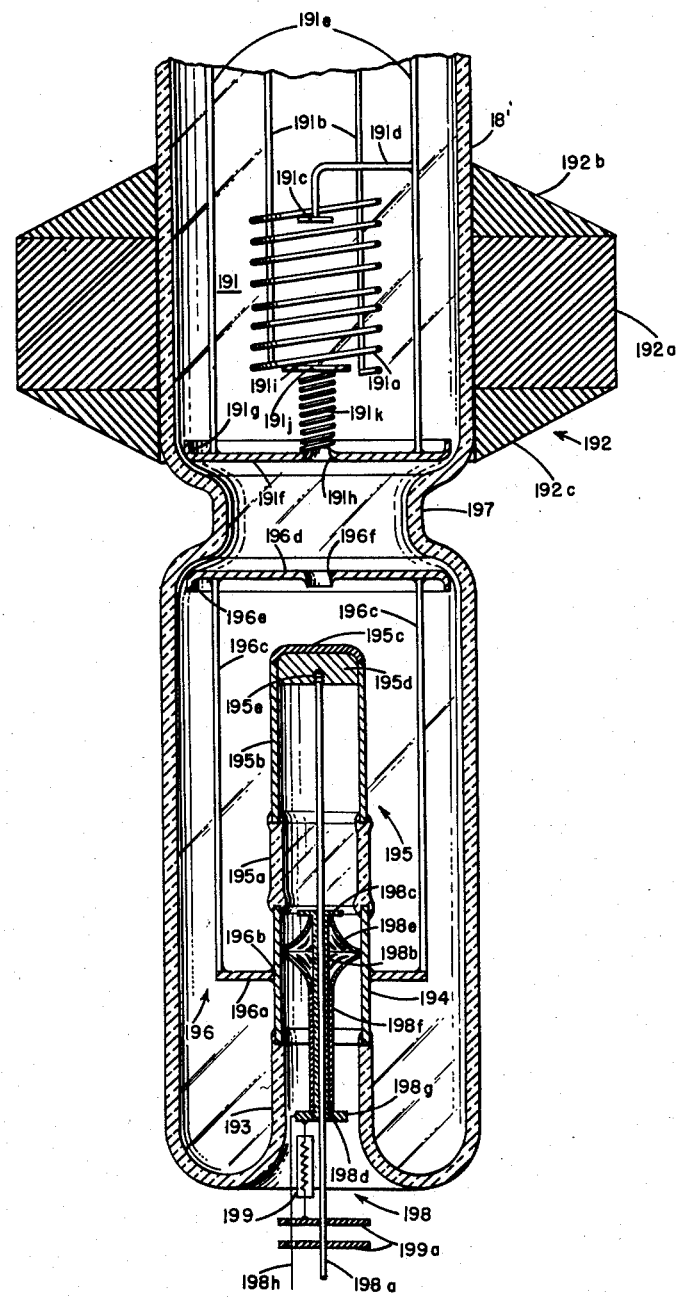

The neutron generator of FIG. 4 also includes a suppressor electrode assembly 196 comprised of a disc 196a having a central opening 196b for receiving connector 194. Disc 196a is welded to connector 194 and to a plurality of support rods 196c which extend upwardly through the lower portion of envelope 18'. Support rods 196c terminate at a metallic suppressor electrode or disc 196d, having a downwardly flared peripheral edge 196e and a central opening 196f. The disc material about opening 196f is flared downwardly in opposition to the flaring of the edge of opening 191b to minimize the possibility of breakdown.

Suppressor electrode 196d is supported within the envelope in a selected position between electrode 191f and target 195c. To minimize further the possibility of breakdown, a portion 197 of envelope 18', enclosing the area between electrodes 191f and 196d, is reduced to a diameter smaller than the diameter of these electrodes.

In the ion source 191, the electric field between anode 191a and cathodes 191c and 191i is such that it is crossed with the magnetic field produced by magnetic assembly 192, leading to circular electron paths of long total length, and consequent high ionization. In the gap between electrodes 191f and 196d, the electric and magnetic fields are not crossed and ionization is reduced below the intensity at which a discharge is initiated. Moreover, the electrode spacings in the ion source and in the accelerating gap are suitably arranged in connection with the foregoing considerations to provide the desired ionization in the ion source and freedom from ionization in the accelerating gap.

In order to complete electrical connections to electrodes 195c and 196d, a connector assembly 198 is provided. This assembly comprises a metallic rod 198a which extends through envelope section 193, connector 194 and tubular members 195a and 195b. The upper end of this rod is threaded into opening 195e and thus is electrically connected to target 195c. A portion of rod 198a receives a sleeve 198b of an electrically insulating material having a shouldered upper end 198c and a threaded lower end 198d. An expansible connector 198e of generally cylindrical configuration is supported on insulator 198b with its upper end abutting shoulder 198c. Its lower end is engaged by a driving sleeve 198f, in turn having its lower end engaged by a driving nut 198g.

Member 198e, for example, may be constructed of a cylinder of resilient material having a plurality of slots extending longitudinally so that when the cylinder is compressed in an axial direction, the material between the slots is driven radially. Accordingly, when nut 198g is tightened, cylinder 198f is driven upwardly and member 198e is compressed between the cylinder and shoulder 198c, and it expands into electrical engagement with the inner surface of connector 194. Thus, an electrical connection to suppressor 196d may be made by connecting a lead 198h to nut 198g.

An electrical connection to target 195g may be made by extending a lead from rod 198a. However, in the illustrated arrangement, a dropping resistor 199 is connected between nut 198g and one of a plurality of metallic cooling fins 199a that are fixed to the lower end of rod 198a.

An energizing circuit for anode 191a and cathodes 191c and 191i of ion source 191 may be provided in a manner described in the copending application of J. T. Dewan, filed April 9, 1952, bearing the Serial Number 281,378 and issued February 28, 1961, as Patent No. 2,973,444. The high voltage for the accelerating gap of the generator may be supplied over connections to one of support rods 191e and lead 198h.

In operation, deuterium gas within envelope 18' is ionized within ion source 191 which operates in the manner described in the aforementioned application of J. T. Dewan. Some of the resulting ions pass through opening 191g of cathode 191i, helix 191k and opening 191h and thus come into the influence of the accelerating potential applied between probe plate 191f and electrode 196d. Many of these ions are accelerated to high velocities, pass through opening 196f in suppressor 196d and strike target layer 195c with a velocity suitable to the production of neutrons.

Since the accelerating gap current flows through resistor 199, a voltage drop is developed which maintains suppressor 196d at a negative potential relative to target 195g. Under this condition, secondary electrons which might otherwise be accelerated in a direction opposite to ion travel are repelled toward the target and, for the most part, do not pass through opening 196f of electrode 196d. Thus, electron current flow within the neutron generator is minimized, thereby reducing the power required for its operation.

Obviously, the relatively flat construction of electrodes 191f, 196d and 195c in the neutron generator of FIG. 4 permits relatively simple constructional techniques to be employed in the fabrication of a neutron generator embodying the invention. Accordingly, the cost of such a generator is materially lower than other types.

Figure 5:
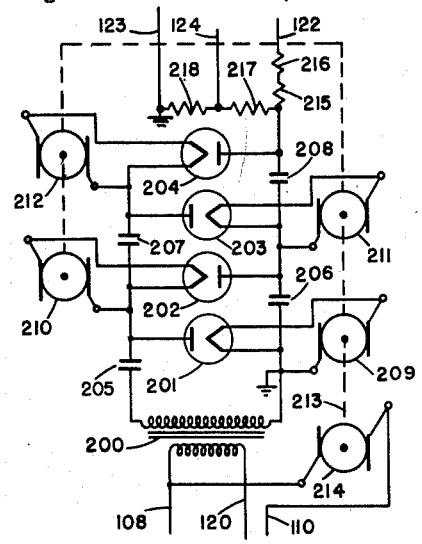
FIG. 5 is a schematic diagram of a high voltage power supply suitable for use in the portion of the apparatus shown in FIG. 1C.

In FIG. 5 of the drawings, there is illustrated one form of circuit which may be employed for high voltage power supply 121 of FIG. 1C. Input leads 108 and 120 are connected to the primary winding of a step-up transformer 200 which supplies 20 kilovolts to a voltage multiplier of conventional construction employing diode rectifiers 201–204 and charging condensers 205–208. The filaments of the diode rectifiers are energized by individual generators 209–212 which are driven simultaneously by mechanical couplings of electrically insulating material, schematically illustrated by dash line 213. Motive power for the generators is supplied by a motor 214 connected to power leads 108 and 110.

The output of the voltage multiplier is derived between housing connection 123 and lead 122. A pair of series-connected surge resistors 215, 216 are interposed in lead 122, and a pair of series-connected resistors 217, 218 form a voltage divider connected between the junction of resistor 215 with condenser 208 and lead 123. Lead 124 is connected to the junction of resistors 217 and 218 which are apportioned to provide a potential of the order of 1½ kilovolts between leads 123 and 124.

In operation, the alternating potential at leads 108, 110 energizes motor 214 which drives generators 209–212 at an essentially constant speed. Thus, the filament potentials applied to rectifiers 201–204 are of substantially constant amplitude values. The alternating potential between leads 108, 120 is stepped up to approximately 20 kilovolts by transformer 200 before being multiplied by the system of rectifiers 201–204 and condensers 205–208 to a unidirectional potential of approximately 100 kilovolts, in a well known fashion.

Since the potential at leads 108, 120 is under the control of voltage control circuit 119, the output potential of the power supply available at leads 122, 123 is automatically adjusted in the manner described hereinbefore in connection with neutron flux control.

Figure 6:
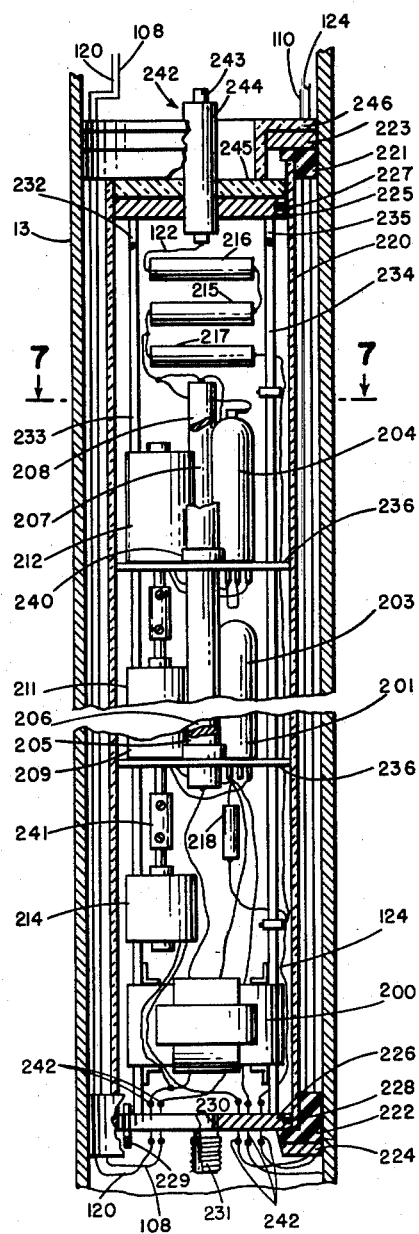
FIG. 6 is a view in longitudinal section of the power supply represented in FIG. 4, as incorporated in logging apparatus.

In FIG. 6 there is illustrated a typical physical arrangement for the components of the power supply shown in FIG. 5. These components, which have been assigned the same reference numerals used to identify their counterparts in FIG. 5, are enclosed by a cylindrical glass housing 220 supported coaxially within housing 13 by upper and lower, flanged, resilient shock mounts 221 and 222. These shock mounts are associated with upper and lower retaining rings 223 and 224 which are secured to housing 13 by means not shown.

The housing is closed by upper and lower discs 225 and 226 suitably sealed to the inner surface of glass housing 220 so that a fluid-tight container is achieved. For example, O type sealing rings 227 and 228 may be employed for this purpose. A valved tube 229 passes through lower closure 226 and is employed for admitting an oil filling into closed glass cylinder 220. If desired, another valved tube (not shown) may be provided as an air vent to facilitate the filling process. A central opening 230 in lower closure 226 communicates with a closed bellows 231 that accommodates changes in volume of the oil with variations in temperature.

Four support rods 232–235 extend longitudinally through cylindrical housing 220. These rods are transversely spaced relative to one another to define the corners of a square figure in a horizontal plane, and they are attached at their ends to closure plates 225 and 226. These rods serve to space the plates 225 and 226 from one another, as well as to support a plurality of essentially similar chassis-like plates 236 in longitudinally spaced relation along housing 220.

Figure 7:
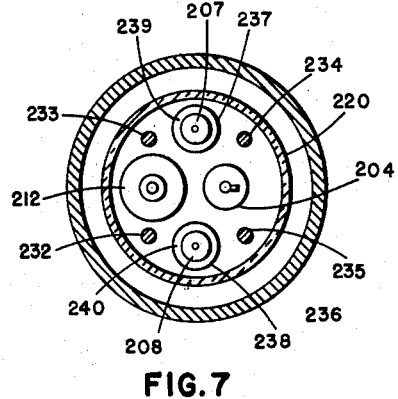
FIG. 7 is a sectional view taken along line 7—7 of FIG. 6.

The uppermost one of chassis plates 236 has mounted thereon rectifier 204 and generator 212, as may be seen in FIG. 7. Condensers 207 and 208 are of cylindrical form and pass through respective openings 237 and 238 in the uppermost chassis 236. They extend essentially like distances above and below this chassis and are secured thereto by respective clamps 239 and 240.

Rectifier 203 and generator 211 are mounted on the next uppermost one of chassis plates 236 (not shown). This plate does not require openings for receiving any of the condensers.

The third uppermost of plates 236 (not shown) supports rectifier 202 and generator 210 and has openings for receiving cylindrical condensers 205 and 206. These condensers are so positioned that they pass through openings in the lowermost one of plates 236 which supports rectifier 201 and generator 209.

As is evident in FIG. 6, the several generators are mounted with their shafts in axial alignment. They are mechanically connected together by a plurality of mechanical couplings 241 constructed of an electrically insulating material suitable to withstand the highest voltages developed in the power supply. The lowermost of the couplings 241 is connected to driving motor 214 that is supported below the lowermost of mounting plates 236.

Transformer 200 is supported within glass housing 220 in a position below generator 214. A plurality of leads 242 extend through, but are electrically insulated from, closure plate 226 so that electrical connections may be made to the transformer and to the motor. Of course, these connections are suitably sealed, in a well known manner, so that there may be no fluid leakage.

Resistors 215, 216 and 217 are mounted in the uppermost part of the housing, while resistor 218 is mounted in the section containing transformer 200. This disposition is provided because it is important to isolate the high voltage portion of the power supply from all other points in order to prevent voltage breakdown.

A high voltage terminal 242 passes through a central opening in upper closure 225. It comprises an electrically conductive rod 243 received by a sleeve 244 of electrically insulating material. The rod 243, the sleeve 244 and plate 225 are suitably sealed to effect a fluid-tight arrangement. Insulating sleeve 244 has a dielectric strength and thickness suitable to withstand the maximum voltage developed by the power supply without breakdown. A plate 245 of insulating material covers the upper surface of closure 225 and is held in place by a ring 246 of L-shaped cross section seated on retainer 223.

The physical arrangement just described features mechanical ruggedness and freedom from electrical breakdown. The power supply thus may operate efficiently and reliably in logging service.

The several generators are employed so that electrical isolation may be achieved between the several filament circuits of the rectifiers which obviously may be subjected to extremely high relative voltages in the multiplier circuit.

Figure 8:
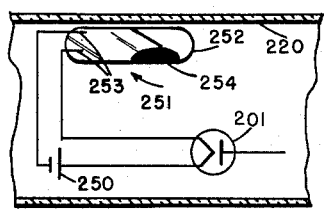
FIG. 8 represents a modification which may be made to the circuit arrangement of FIG. 4.

If battery operation of the rectifier filaments is desired, the modification of FIG. 8 may be employed. While the filament circuit for rectifier 201 alone has been shown, it is to be understood that the remaining rectifiers may be similarly arranged.

A filament battery 250 is connected to the filament of rectifier 201 via a position-sensitive or gravity-operated switch 251. This switch may, for example, comprise a glass capsule 252 secured to glass housing 220. A pair of contacts 253 extend through the capsule wall and a small quantity or pool of mercury 254 is provided.

When the logging apparatus is in an inoperative, horizontal position, mercury pool 254 is out of engagement with contacts 253. However, when the apparatus is placed in a vertical position, required for a logging run, mercury pool 254 completes the filament circuit at contacts 253.

With this modification, the filament batteries may be enclosed within oil-filled housing 220 and no undue complications in the filament switching circuit are required to accommodate the high voltages of the voltage multiplier.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A neutron generator comprising: a sealed envelope filled with an ionizable gas; a target supported within said envelope and including a material adapted to react with ions of said gas to produce neutrons, the content of said material being variable along a path on said target; means for deriving ions of said gas and for accelerating such derived ions in a beam toward said path on said target to a velocity sufficient to effect neutron-producing reactions; and means for adjusting a characteristic of said beam in at least one dimension in the vicinity of said target thereby to control the neutron flux output of said generator.

2. A neutron generator comprising: a sealed envelope filled with an ionizable gas; a target supported within said envelope and including a material adapted to react with ions of said gas to produce neutrons, the content of said material varying radially from a given point on said target; means for deriving ions of said gas and for accelerating such derived ions in a beam toward said point of said target to a velocity sufficient to effect neutron-producing reactions; and means for adjusting the cross sectional area of said beam in the vicinity of said target thereby to control the neutron flux output of said generator.

3. A neutron generator comprising: a sealed envelope filled with an ionizable gas; a target supported within said envelope and including a material adapted to react with ions of said gas to produce neutrons, the content of said material varying radially from a given point on said target; means for deriving ions of said gas and for accelerating such derived ions in a beam toward said point of said target to a velocity sufficient to effect neutron-producing reactions; and means responsive to the neutron flux output of said generator for adjusting the cross sectional area of said beam in the vicinity of said target in such a manner so as to maintain said neutron flux output substantially constant.

4. A neutron generator comprising: a sealed envelope filled with an ionizable gas; a target supported within said envelope and including a material adapted to react with ions of said gas to produce neutrons, the content of said material increasing radially from a given point on said target; means for deriving ions of said gas and for accelerating such derived ions in a beam toward said point of said target to a velocity sufficient to effect neutron-producing reactions; and control means for adjusting the cross sectional area of said beam in the vicinity of said target inversely with the neutron flux output of said generator thereby to maintain said neutron flux output substantially constant.

5. A neutron generator comprising: a sealed envelope filled with an ionizable gas; a target supported within said envelope and including a material adapted to react with ions of said gas to produce neutrons, the content of said material being variable along a path on said target; means for deriving ions of said gas and for accelerating such derived ions in a beam toward said path on said target to a velocity sufficient to effect neutron-producing reactions; and means for adjusting the position of said beam along said path on said target thereby to control the neutron flux output of said generator.

6. A neutron generator comprising: a sealed envelope filled with an ionizable gas; a target supported within said envelope and adapted to react with ions of said gas to produce neutrons; ionization means associated with said envelope for deriving ions of the gas therein, but requiring external radiation for the initiation of ionization; means for accelerating ions derived by said ionization means toward said target to a velocity sufficient to effect neutron-producing reactions; a planar electrode having an aperture through which said accelerated ions may pass supported within said envelope between said target and said ionization means; and a source of radiation for irradiating said gas to initiate ionization for said ionization means.

7. A neutron generator comprising: a sealed envelope filled with an ionizable gas; a target supported within said envelope and adapted to react with ions of said gas to produce neutrons; ionization means including a tubular support positioned within said envelope, coupling means mounted externally of said tubular support, but internally of said envelope for coupling radiofrequency energy to the gas within said tubular support, and a source of radiofrequency energy electrically coupled to said coupling means; means for accelerating ions derived by said ionization means toward said target to a velocity sufficient to effect neutron-producing reactions; a planar electrode having an aperture through which said accelerated ions may pass supported within said envelope between said target and said ionization means; and a quantity of radioactive material secured to said tubular support for irradiating the gas therein to initiate ionization for said ionization means.

8. A neutron generator comprising: a sealed envelope filled with an ionizable gas; a target for reacting with ions of said gas to produce neutrons; means for deriving ions of said gas and for accelerating said ions toward said target to a velocity sufficient to effect neutron-producing reactions; means exposed to the gas within said envelope and including a device for emitting and a device for absorbing gas; a control system for adjusting the rate of gas flow for at least one of said devices to regulate the gas pressure within said envelope in response to a control potential; and a pressure gauge including a chamber exposed to the gas within said envelope, a magnet at least partially constituting an anode supported within said chamber, a cathode positioned in the field of said magnet, means for effecting a flow of electric current between said anode and said cathode, and means responsive to said flow of electric current to derive a control potential for application to said control system.

9. A neutron generator comprising: a sealed envelope filled with an ionizable gas; a partition dividing said envelope into first and second chambers and having a gas-communicating aperture; neutron-deriving means disposed within said first chamber and including a target, means for deriving ions of said gas and means for accelerating said ions toward said target to a velocity sufficient to effect neutron-producing reactions; means disposed within said second chamber and including a device for emitting and a device for absorbing gas; a pressure gauge disposed within said second chamber for deriving a control potential responsive to the gas pressure in said envelope; and a control circuit coupled to said pressure gauge and to said last-mentioned means for adjusting the rate of gas flow for at least one of said devices in response to said control potential and thereby regulate the gas pressure in said envelope.

10. A neutron generator comprising: a sealed envelope filled with an ionizable gas; a partition dividing said envelope into first and second chambers and having a gas-communicating aperture; neutron-deriving means disposed within said first chamber and including a target, means for deriving ions of said gas and means for accelerating said ions toward said target to a velocity sufficient to effect neutron-producing reactions; gas pressure control means disposed within said second chamber; and a baffle member supported within said envelope in the vicinity of said aperture for intercepting particles having a velocity component directed through said aperture from said first chamber.

11. A neutron generator comprising: a sealed envelope filled with an ionizable gas; a partition dividing said envelope into first and second chambers and having a gas-communicating aperture; neutron-deriving means disposed within said first chamber and including a target, means for deriving ions of said gas and means for accelerating said ions toward said target to a velocity sufficient to effect neutron-producing reactions; gas pressure control means disposed within said second chamber; and a baffle member constructed of a material of low atomic number supported within said second chamber in the vicinity of said aperture for intercepting particles having a velocity component directed through said aperture from said first chamber.

12. A neutron generator comprising: a sealed envelope filled with an ionizable gas; means associated with said envelope for deriving ions of said gas; a planar electrode positioned within said envelope, included in an accelerating gap and having an aperture for admitting ions into said gap for acceleration; and a planar target electrode positioned within said envelope in spaced parallel relation to said first-mentioned electrode and adapted to react with accelerated ions to produce neutrons.

13. A neutron generator comprising: a sealed envelope filled with an ionizable gas; means associated with said envelope for deriving ions of said gas; a planar electrode positioned within said envelope, included in an accelerating gap and having an aperture for admitting ions into said gap for acceleration; a planar target electrode positioned within said envelope in spaced, parallel relation to said first-mentioned electrode and adapted to react with accelerated ions to produce neutrons; and a planar auxiliary electrode positioned within said envelope between said first mentioned and said target electrodes in spaced, parallel relation to said first-mentioned electrode and having an aperture in substantial alignment with said aperture of said first-mentioned electrode for permitting accelerated ions to pass to said target electrode.

14. A neutron generator comprising: a sealed envelope filled with an ionizable gas; means associated with said envelope for deriving ions of said gas; a planar electrode positioned within said envelope, included in an accelerating gap and having an aperture for admitting ions into said gap for acceleration; a planar target electrode positioned within said envelope in spaced, parallel relation to said first-mentionel electrode and adapted to react with accelerated ions to produce neutrons; a planar auxiliary electrode positioned within said envelope between said first-mentioned and said target electrodes in spaced, parallel relation to said first-mentioned electrode and having an aperture in substantial alignment with said aperture of said first-mentioned electrode for permitting accelerated ions to pass to said target electrode; and said envelope including a portion disposed between said first-mentioned and said auxiliary electrodes and having a peripheral length in a plane parallel to said first-mentioned electrode smaller than the peripheral lengths of said first-mentioned and auxiliary electrodes.

15. A neutron generator comprising: a sealed envelope containing an ionizable gas; means associated with said envelope for deriving ions of said gas; a planar electrode positioned within said envelope, included in an accelerating gap and having an aperture for admitting ions into said gap for acceleration; a target electrode positioned within said envelope in spaced relation to said first-mentioned electrode and having a material adapted to react with accelerated ions to produce neutrons; a planar auxiliary electrode positioned within said envelope between said first-mentioned and said target electrodes in spaced, parallel relation to said first-mentioned electrode and having an aperture in substantial alignment with said aperture of said first-mentioned electrode for permitting accelerated ions to pass to said target electrode; and said envelope including a portion disposed between said first-mentioned and said auxiliary electrodes, having a peripheral length in a plane parallel to said first-mentioned electrode smaller than the peripheral lengths of said first-mentioned and auxiliary electrodes, and forming shoulders interfitting with said first-mentioned and said auxiliary electrodes.

16. A neutron generator comprising: a tubular envelope including a portion of reduced peripheral length in a plane transverse to the longitudinal axis of said envelope defining opposed shoulders, said envelope containing an ionizable gas; means associated with at least a portion of said envelope for deriving ions of said gas; a planar electrode positioned within said envelope in interfitting relation with one of said shoulders and included in an accelerating gap, said electrode having an aperture for admitting ions into said gap for acceleration; a target electrode positioned within said envelope in spaced relation to said first-mentioned electrode and having a material adapted to react with accelerated ions to produce neutrons; and a planar auxiliary electrode positioned within said envelope between said first-mentioned and said target electrodes in interfitting relation with the other of said shoulders and in spaced, parallel relation to said first-mentioned electrode, said auxiliary electrode having an aperture in substantial alignment with said aperture of said first-mentioned electrode for permitting accelerated ions to pass to said target electrode.

17. A neutron generator comprising: a tubular, generally cylindrical envelope including a portion of one diameter and adjacent portions of greater diameter forming internal annular shoulders, said envelope containing an ionizable gas; means associated with at least a portion of said envelope for deriving ions of said gas; a generally disc-shaped electrode and having a diameter intermediate the aforesaid one and greater diameters, said electrode being positioned within said envelope in interfitting relation with one of said shoulders and having an aperture for the passage of ions; a target electrode positioned within said envelope in spaced relation to said first-mentioned electrode and having a material adapted to react with accelerated ions to produce neutrons; and a generally disc-shaped auxiliary electrode having a diameter intermediate the aforesaid one and greater diameters positioned within said envelope between said first-mentioned and said target electrodes in spaced relation to said first-mentioned electrode and having an aperture in substantial alignment with said aperture of said first-mentioned electrode for permitting ions to pass to said target electrode.

18. A neutron generator comprising: a generally cylindrical envelope containing an ionizable gas, said envelope including first and second portions of a given diameter, a third portion intermediate said first and second portions of a diameter smaller than said given diameter forming annular, internal shoulders and a fourth, re-entrant portion extending within said first portion; means associated with at least a portion of the gas within said second portion of said envelope for deriving ions of said gas; a generally disc-shaped electrode positioned within said envelope in interfitting relation with one of said shoulders and having an aperture for the passage of ions; a target electrode supported within said envelope by said fourth portion thereof in spaced relation to said first-mentioned electrode and having a material adapted to react with accelerated ions to produce neutrons; and a second, generally disc-shaped electrode positioned within said envelope in interfitting relation with the other of said shoulders between said first-mentioned and said target electrodes and having an aperture in substantial alignment with said aperture of said first-mentioned electrode for the passage of ions to said target electrode.

19. A neutron generator comprising: a sealed envelope filled with an ionizable gas; a target supported within said envelope and including a material adapted to react with ions of said gas to produce neutrons, the content of said material on said target being variable so that the quantity of neutrons produced may be varied; means for deriving ions of said gas and for accelerating such derived ions in a beam toward said material on said target to a velocity sufficient to effect neutron-producing reactions; and means for adjusting the focusing of said beam in at least one dimension in the vicinity of said target thereby to control the neutron flux output of said generator.

20. A neutron generator comprising: a sealed envelope filled with an ionizable gas; a target supported within said envelope and adapted to react with ions of said gas to produce neutrons; ionization means including a pair of annular electrodes supported in spaced apart coaxial relation externally of an intermediate non-metallic tubular portion of said envelope, to promote ionization of said gas within said tubular portion when energized by radio-frequency energy; means forming a partition between said ionization means and said target, including an ion accelerating electrode having an aperture therethrough; and means for applying high potential between said target and said apertured electrode for accelerating ions derived by said ionization means toward said target to a velocity sufficient to effect neutron-producing reactions.

21. A neutron generator comprising: an elongated pressure-resistant housing, a sealed envelope within said housing filled with an ionizable gas; a target supported within said envelope and adapted to react with ions of said gas to produce neutrons; ionization means within said envelope for deriving ions of the gas therein; an electrode partitioning said envelope into a region including said ionization means and a region including said target and having an aperture; a high voltage source connected between said electrode and said target and positioned in said housing on one side of said envelope for applying an accelerating voltage between said electrode and target to accelerate the ions derived by said ionization means toward said target to a velocity sufficient to effect neutron-producing reactions, and insulating means surrounding said high voltage source to insulate it from said housing; and a current supply conductor in said housing extending past said envelope and said insulating means externally thereof for connection at the end of said high voltage source opposite from said envelope.

References Cited in the file of this patent

UNITED STATES PATENTS

| | | |
|---|---|---|
| 2,211,668 | Penning | Aug. 13, 1940 |
| 2,408,230 | Shoupp | Sept. 24, 1946 |
| 2,689,918 | Youmans | Sept. 21, 1954 |
| 2,712,081 | Fearon et al. | June 28, 1955 |
| 2,735,019 | Dewan et al. | Feb. 14, 1956 |
| 2,825,816 | Rogers | Mar. 4, 1958 |
| 2,908,823 | Ely | Oct. 13, 1959 |